No. 800,217. PATENTED SEPT. 26, 1905.
G. B. KEPLINGER.
CHECK OR COUNTER.
APPLICATION FILED MAY 2, 1904.
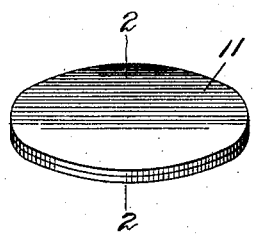
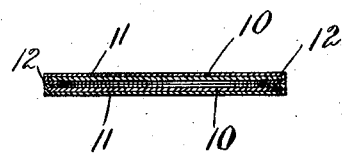
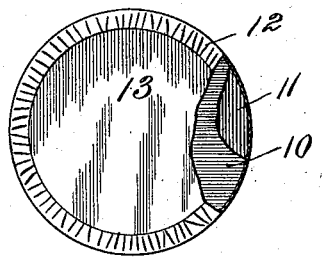
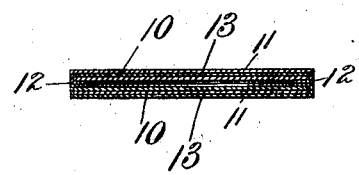
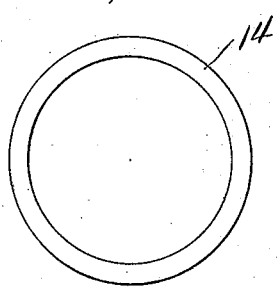
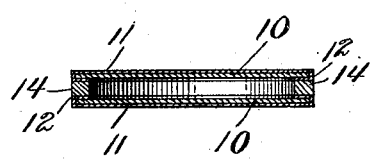
Witnesses:
Ray White.
Harry R. Liolill.
Inventor:
George B. Keplinger
By Coburn & McRoberts Attys

UNITED STATES PATENT OFFICE.

GEORGE B. KEPLINGER, OF CHICAGO, ILLINOIS.

CHECK OR COUNTER.

No. 800,217.   Specification of Letters Patent.   Patented Sept. 26, 1905.

Application filed May 2, 1904. Serial No. 205,921.

*To all whom it may concern:*

Be it known that I, GEORGE B. KEPLINGER, a citizen of the United States, residing at Chicago, in the county of Cook and State of Illinois, have invented certain new and useful Improvements in Checks or Counters, of which the following is a specification.

This invention has reference to an article designed to be used in playing certain games—such as card-games, the game of checkers, and the like—or for checking articles, indicating amounts of purchase, or for any other purpose for which checks or counters are usually employed.

The object of the invention is to provide an article of this character which may be readily made at small cost, and that shall be practically noiseless and indestructible.

The invention consists of the article hereinafter particularly described, and pointed out in the appended claims.

Figure 1 is a perspective view of a check or counter made in accordance with my invention. Fig. 2 is a section on the line 2 2 of Fig. 1. Fig. 3 is a rear side view of one of the disks employed in a modified form of check or counter, parts being broken away to show the backing-disks. Fig. 4 is a diametrical section of a check or counter composed of two sections similar to that illustrated in Fig. 3. Fig. 5 is a diametrical section of a further modification of the check or counter. Fig. 6 is a detail of the ring employed in the check illustrated in Fig. 5.

In carrying out the invention I employ a pair of corresponding sections, each of which comprises a back plate provided with a cover of plastic or flexible material, such as celluloid. This cover at its margin is turned over the edge of the back plate, and the two sections are then secured together with their reverse faces toward each other and fastened or made to adhere in any suitable manner.

The plate 10 of each section may be made of any suitable material to provide a rigid imperforate backing for the covering of the check or counter and is preferably in the form of a metal disk made of any suitable size. The disks 10 are preferably made of tin, this material being particularly useful for the purpose, as it may be rolled very thin, so as to be of little weight. Each of the disks 10 is covered with a thin sheet or layer of celluloid 11 or any other plastic, preferably transparent, material. The cover 11 is cut to a size a little larger than the disk, and the margin of same is turned over the edge of the disk and bent inwardly, as at 12, against the reverse face of the disk, as by crimping or in any other preferred manner. The two sections are then placed with their reverse faces adjacent and secured together by glue or cement or in any other desired manner.

In order to provide an article of greater thickness than that resulting from the construction heretofore described without appreciably increasing the weight of the same, one or both of the sections may be provided with a reinforcing disk of pasteboard or similar material of light weight, as shown in Figs. 3 and 4, in the latter of which figures each of the sections is shown with a disk 13 of this character. The disks 13 are cut to the same size as the metal disks 10, the two sections then being secured together in the same manner as the sections shown in Fig. 2, where the disks 13 are omitted.

A further modification is shown in Fig. 5. The two sections in this form are of the same character as the sections seen in Fig. 2. For the purpose of spacing the sections apart to increase the thickness of the check or counter I here employ an annulus 14, the perimeter of which corresponds to that of the sections employed. This ring may be of the same material as the covers 11 and of a thickness depending upon the thickness it is desired to make the check or counter.

The two sections of the check are secured to the opposite faces of the ring 14 with their edges flush with the outside of said ring, as shown in Fig. 5.

Any suitable matter—such as advertisements, pictures, numbers, or ornamentation—may be placed upon the covers 11, or if celluloid or other transparent material is employed for the covers the printing or ornamentation may be placed under the same. I do not, however, wish to be understood as limiting myself to the use of celluloid as any other flexible material similar to and possessing the same characteristics as celluloid may be employed.

A check or counter of the character described is exceedingly light, and as the material from which it is made is inexpensive it may be manufactured at small cost. Moreover, it is practically indestructible, as there is no danger of its breaking or chipping off. It is also practically noiseless as the celluloid with which the backing provided by the back plates is covered deadens the noise when the chip or counter is thrown or falls against a hard surface.

I claim—

1. An article of the class described comprising a pair of plates each of which is provided with a covering of plastic material, the covering of each plate being turned over the edge of the same and secured to the covering of the other plate.

2. An article of the class described comprising a pair of plates each of which is provided with a sheet of plastic material covering the outer face of the same and having the edge turned inwardly between the plates, the said plates being secured together with the inturned edges between the same.

3. An article of the class described comprising a pair of plates provided with a reinforcing layer and a sheet of plastic material covering each plate and having its edge turned inwardly between the plates, the said plates being secured together with the inturned edges between the same.

In testimony whereof I affix my signature in presence of two witnesses.

GEORGE B. KEPLINGER.

Witnesses:
 ARTHUR B. SEIBOLD,
 ELIZABETH MOLITOR.